(12) United States Patent
Qiu et al.

(10) Patent No.: US 8,589,417 B2
(45) Date of Patent: Nov. 19, 2013

(54) INQUIRY-ORIENTED USER INPUT APPARATUS AND METHOD

(75) Inventors: Weigen Qiu, Calgary (CA); Roland E. Williams, Martinez, CA (US); William J. Templeton-Steadman, Hemel Hempstead (GB)

(73) Assignee: ZI Corporation of Canada, Inc., Calgary, Alberta (CA)

( * ) Notice: Subject to any disclaimer, the term of this patent is extended or adjusted under 35 U.S.C. 154(b) by 96 days.

(21) Appl. No.: 13/095,752

(22) Filed: Apr. 27, 2011

(65) Prior Publication Data

US 2011/0258551 A1    Oct. 20, 2011

Related U.S. Application Data

(63) Continuation of application No. 12/245,696, filed on Oct. 3, 2008, now Pat. No. 7,974,979.

(60) Provisional application No. 60/978,014, filed on Oct. 5, 2007.

(51) Int. Cl.
  *G06F 17/30* (2006.01)
(52) U.S. Cl.
  CPC .................................. *G06F 17/3053* (2013.01)
  USPC ............................ 707/749; 707/748; 707/752
(58) Field of Classification Search
  USPC .......... 707/741, 748, 749, 750, 752; 709/207; 704/10; 715/264, 535
  See application file for complete search history.

(56) References Cited

U.S. PATENT DOCUMENTS

| 4,689,743 | A | 8/1987 | Chiu |
| 4,951,202 | A | 8/1990 | Yan |
| 5,109,352 | A | 4/1992 | O'Dell |
| 6,003,049 | A | 12/1999 | Chiang |
| 6,011,554 | A | 1/2000 | King et al. |
| 7,315,982 | B2 | 1/2008 | Becker |
| 7,340,450 | B2 | 3/2008 | Sugahara et al. |
| 7,372,976 | B2 | 5/2008 | Rhoads et al. |
| 7,391,917 | B2 * | 6/2008 | Ohta et al. ..................... 382/253 |
| 2002/0193984 | A1 | 12/2002 | Sugano |
| 2004/0181588 | A1 | 9/2004 | Wang et al. |
| 2006/0129928 | A1 | 6/2006 | Qui |
| 2006/0142997 | A1 | 6/2006 | Jakobsen et al. |
| 2006/0247915 | A1 | 11/2006 | Bradford et al. |
| 2007/0076862 | A1 | 4/2007 | Chatterjee et al. |
| 2010/0332481 | A1 * | 12/2010 | Rowney ........................ 707/747 |

FOREIGN PATENT DOCUMENTS

WO    WO 2007/005945 A2    1/2007

OTHER PUBLICATIONS

PCT/CA2008/001762 International Search Report and Written Opinion; Jan. 14, 2009; Zi Corporation of Canada, Inc.

* cited by examiner

*Primary Examiner* — Shahid Alam
(74) *Attorney, Agent, or Firm* — Michael A. Glenn; Perkins Coie LLP

(57) ABSTRACT

User input from a reduced keypad is disambiguated and compared with a first dynamic lexicon, and predicted matches (e.g. either a single word or phrase) are offered. If a user continues to type beyond a boundary condition, then input is no longer predicted from the first lexicon, but instead is interpreted as a request for matches from a second, quasi-static lexicon allowing words or phrases to be entered. When the entry is accepted, data is transmitted to a remote receiver and may be parsed as an inquiry for subsequent operation. Following acceptance, the apparatus invokes a program suitable for interacting with the response generated to the inquiry.

5 Claims, 2 Drawing Sheets

INQUIRY-ORIENTED USER INPUT APPARATUS AND METHOD

CROSS-REFERENCE TO RELATED APPLICATION

This application is a continuation of U.S. patent application Ser. No. 12/245,696 filed Oct. 3, 2008, which claims benefit of priority to U.S. Provisional Patent Application Ser. No. 60/978,014, filed on Oct. 5, 2007, all of which are incorporated herein in their entirety by this reference thereto.

FIELD OF THE INVENTION

The present invention relates to systems and methods of using an appliance having polysemous entry keys. The present invention may be embodied as a personal appliance that searches data tables in a particular fashion that is believed to be particularly useful to the user of such an appliance.

BACKGROUND OF THE INVENTION

Inquiries or searches made from a computing appliance such as a personal computer are generally performed by entry of a text string comprising one or more words and submitting this list to a remote computer which matches these keywords or search terms to a list of information accumulated from the public Internet or other networked array of computers and storage media. In general, the entry of text is done deterministically and is achieved by keyboards or their functional equivalents, or else by some manner of handwriting recognition using a touch-sensitive pad or screen. Handwriting recognition methods include symbolic entry, including discrete symbols, as popularized by early Personal Digital Assistants and motion recognition methods, where a sequence of symbols or letters are connected by some stylus or pen motion to give a letter string associated with the resultant shape. Similar technology may be used for ideographic entry.

Transferring this capability to a mobile appliance has been largely disappointing, primarily because such appliances have limited capability for user interaction, due in large part to the small size of the display and to the keyboard having fewer keys than found on a full scale keyboard. Adopting the paradigm of a larger computer platform to a mobile appliance requires the user to invoke a browser session and then create a search entry using the same methods is unwieldy for the majority of cases. Although eventually a browser-like session will be required in order to interact with the Internet, embodiments of the invention may result in a reduction of time and bandwidth use that result from having to invoke a browser prior to any processing being possible.

SUMMARY OF THE INVENTION

The invention may be embodied as a personal appliance having a display, a keypad, memory, processing capability, and a connection to at least one server allowing the entry from the idle screen of ambiguous data due to the association of multiple symbols with at least one or more of the keys (sometimes referred to herein as "polysemous keys"). The personal appliance may be capable of:

a. displaying the entered sequence as a number sequence corresponding to those keys routinely used in telephony applications and identifying the keys pressed;

b. comparing the sequence of pressed keys to one or more predetermined tables stored in memory;

c. retrieving any of the candidates stored in at least one of the predetermined tables, the retrieved candidates matching the entered key sequence;

d. storing the retrieved candidates in a buffer;

e. displaying in a preferred order at least one of the candidates stored in the buffer for user selection;

f. clearing the display of candidates as soon as no candidates are matched from the tables;

g. comparing the entered sequence with a stored dictionary as soon as there are no candidates matched from the predetermined tables, so as to attempt to disambiguate the sequence to text; and h. displaying disambiguated textual candidates for user selection.

The appliance may have a means, such as a microprocessor, for interpreting a selected candidate and invoking a program that allows a user to interact with the possible interpretations of the data associated with the selected candidate.

The appliance may have a means to transmit the selected data to a receiving server or proxy and invoking, without further user intervention, a program that allows a user to interact with the response from the receiving server or proxy.

At least one of the predetermined tables may include candidates that have data associated with them that identify Internet resources so that selection of a candidate drawn from this table will cause the appliance to be connected to the receiving server identified by this resource locator. For example, at least one predetermined table may be dynamically alterable by the network to which the appliance may be connected.

The table may have a validity limit defined by time, so that entries in the table may be removed after a predetermined time has passed. However, the validity limit may be defined by the number of times a link has been accessed, so that after a link has been accessed by the user a predetermined number of times, the link may be removed from the table.

The table may have a validity limit based on a score assigned to the user by the network to which the user is connected. Further, the table may include candidates previously selected by the user according to frequency or recency of selection.

Another embodiment of the invention may be as a personal appliance, having a display, a keypad, and a microprocessor. The keypad may have keys, and at least some of the keys may allow for the entry of more than one symbol with a single press of the key in order to provide an ambiguous indication.

The microprocessor may have the ability to receive one or more ambiguous indications from the keypad, and may be programmed to:

(i) identify entries from a dynamic database that is maintained by a service provider, the identified entries from the dynamic database corresponding to the ambiguous indications;

(ii) provide the identified entries from the dynamic database (which may have entries that have a validity limit) to a user via the display;

(iii) identify entries from a dictionary database stored on the personal appliance if no entries from the dynamic database correspond to the ambiguous indications, and provide the entries from the dictionary database to the user via the display; and (iv) accept from the user a selection of one of the entries from the dictionary database.

The microprocessor of such a personal appliance may be programmed also to automatically establish a communications link with a remote server upon accepting a selection of one of the entries from the dictionary database, and send the accepted selection to the remote server via the communications link. For example, sending the accepted selection to the remote server includes automatically invoking a browser and populating an entry field of the browser with the accepted selection.

In another embodiment of the invention, a personal appliance has a display, a keypad, and a microprocessor. The keypad may have keys, and at least some of the keys may allow for the entry of more than one symbol with a single press of the key in order to provide an ambiguous indication. The microprocessor may have the ability to receive one or more ambiguous indications from the keypad, and may be programmed to:

(i) identify entries from one or more databases, the entries corresponding to the ambiguous indications;

(ii) provide the entries from the one or more databases to a user via the display;

(iii) once the number of entries provided to the user reaches (or is below) a threshold number of entries, an additional database is searched for entries corresponding to the ambiguous indications, and the corresponding entries from the additional database are displayed to the user for selection.

The additional database need not be resident on the personal appliance, and so the microprocessor may be programmed to automatically establish a communications link with the additional database. In the event that the non-resident database is accessible via a browser, the microprocessor may be programmed to automatically invoke the browser and populate an entry field of the browser with one of the entries from the additional database.

In yet another embodiment of the invention, a personal appliance may have a display, a keypad (like that described above), and a microprocessor having the ability to receive ambiguous indications from the polysemous keys of the keypad. The microprocessor may be programmed to:

(i) identify entries from a dynamic database (which may have a validity limit) that is maintained by a service provider and identify entries from a dictionary database stored on the personal appliance, the entries corresponding to the ambiguous indications;

(ii) provide the entries from at least one of the databases to a user via the display, wherein the user may select whether to receive entries from only one of the databases, or both databases.

(iii) accept from the user a selection of one of the provided entries.

The microprocessor may be programmed to automatically establish a communications link with a remote server upon accepting a selection of one of the entries, and send the accepted selection to the remote server. Sending the accepted selection to the remote server may include automatically invoking a browser and populating an entry field of the browser with the accepted selection.

BRIEF DESCRIPTION OF THE DRAWINGS

For a fuller understanding of the nature and objects of the invention, reference should be made to the accompanying drawings and the subsequent description. Briefly, the drawings are:

FIG. 1 also shows an example of a screen layout where an explicit search entry may be commanded by the user. Use of a soft key avoids the dedication of a physical key to this function.

FURTHER DESCRIPTION OF THE INVENTION

Figure 1:
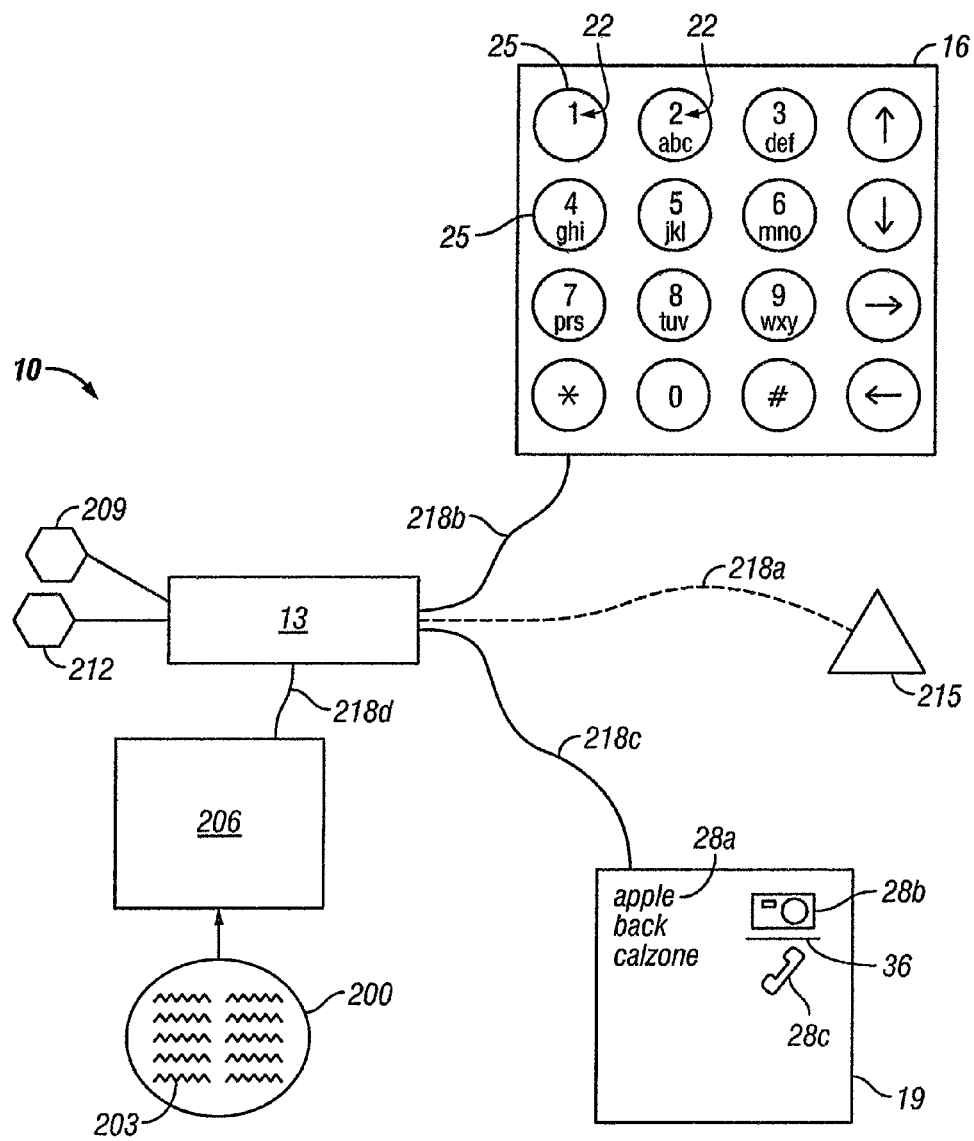
FIG. 1 is a schematic representation depicting a system according to the invention. The system in FIG. 1 shows components of a cellular phone having a keypad which may be implemented as a hardware keypad or alternately as a soft keypad whose operation is discerned by a touch sensitive screen.

U.S. patent application Ser. No. 11/294,995 teaches a method of recovering information local to the user appliance using both literal and disambiguated interpretations of the key-presses made by a user. In use, the underlying application runs in the background and is invisible to the user until entry is started. Once a key is pressed, the program matches the entered keypress against a list that comprises many of the data stored in the appliance. These data may be of numerous types, words, numbers, programs and applications, and selection of any of these will cause a related action to occur. For example if the user enters a number sequence, any previously used number containing that sequence may be shown to the user as soon as it is determined, and its selection would allow an action involving that number to occur without further numeric entry.

This capability is extended by the present invention in a way that allows the entry of categorical information intended for use in an inquiry or search application. Here the user simply enters the ambiguous keystrokes representing the intended string of symbols (which may be characters) and the appliance provides candidates matching the string.

Typical search engine interaction in the personal computing paradigm attempts to match and complete entered words and phrases in order to accelerate the user experience. Entry of a term into a fast search window in a typical browser may cause the appearance not only of the explicitly entered text, but also a list of completed terms or word groups that contain this entered string—in some cases with a matching list of the size of the dataset being indexed. Clearly this action depends upon the interactive exchange of data between the search engine and the computer. Such real-time interaction is less attractive in a mobile environment due to the bandwidth expense and has an un-necessary impact upon network performance. Since the matched possibilities are simply a fast access listing of material that the search engine has pre-organized (allowing the very rapid response to a user without having to run a full search from the very beginning) it is practical to mirror this capability by using the search engine list of categorized terms in the mobile appliance.

U.S. patent application Ser. No. 11/562,054 discloses a method of populating and retrieving data that is dynamic. In this method, the service provider that operates the mobile telephone network is able to address and download data that may be used to populate a table specifically reserved for this purpose. This data may include a list of terms that are most commonly searched as may be obtained from the search engine businesses that service the Internet. For example, the 5,000 most common search data or terms may be stored in a preferred order to facilitate input. In such a system, a search word or term is made accessible to the user when enough users use that item in search queries to make it one of the 5,000 most used search words.

The data itself or its attributes may be changed dynamically at any time according to rules imposed by the provider. For example, entries in the data table may have a time period during which they are valid. After the valid time period expires, the data may be removed from the table.

In addition, information about users may be stored, and used to tailor the presentation or type of data offered to the user. One or more scores may be assigned to a user, and then used to adjust the presentation and/or type of information provided for selection by the user. For example, if a particular user is known to be interested in certain topics, then the user may be assigned a score, and then data corresponding to that score may be presented to the user in a manner that makes it easier for the user to select, for example by listing this data toward the top of a list from which the user selects. Also, data corresponding to those topics may be augmented, so as to entice the user to select that data, for example by providing a photo or short video corresponding to a listed piece of data.

Such an embodiment of the invention may be particularly useful in providing opportunities to unique segments of society that are known to pay for items that may be offensive to other segments of society. In this manner, the risk of offending some people is minimized, while providing other people with easy access to information that they may desire. As an example, individuals known to purchase sexually explicit photos or make phone calls to so called "sex hot lines" may be provided with data corresponding to services offering such photos or phone services in a manner that makes it easy for them to select. Furthermore, in lieu of merely listing a word for selection, the user may be provided also with a sample photo, or video of an attractive member of a particular gender that the user may be interested in. In this manner, bandwidth needed to deliver the photo or video is used only for those users that are most likely to desire such sample photos or videos.

When a user invokes this list as a result of entering information intended for a search, the appliance may interact with this dynamic data management method to anticipate or predict user intended input. This greatly speeds input.

If a user continues to enter data, once a point of uniqueness is reached, whether by entry of a delimiter or by passing the point where a match of the dynamic data table is possible, then the appliance discards the table from the matching process and now interprets the entry as a request by the user to match the input with data in an internal dictionary. Because of the nature of the activity and the highly alterable state of the Internet, the internal dictionary may include a static dictionary. But a static dictionary alone may be insufficient to allow a user to find a suitable matching letter or multiple word sequence. To balance this, a supplementary table may be included in the internal dictionary and used in a manner similar to how a user specific word list is used in predictive text methods. This supplementary table may be a list of recently used terms, and as such, may be updated to reflect a user's recent activity. Having both a static dictionary and an alterable supplementary table, the internal dictionary is "quasi-static" because it is comprised possibly of a static set and a variable set, which are treated as a contiguous data set. The quasi-static dictionary may be used to generate search terms.

Selection of these matching terms may be performed in any of a number of ways well known in the art; e.g. discrete selection by button press or selection using a stylus. Upon selection, the terms (which may also be a sequence of symbols) may be passed to a remote receiver using a communication channel available to the appliance. Selection may also cause the invocation of a browser or other suitable program for display of data received in response to the inquiry so that the user may subsequently more easily interact with the remote server.

As such, the invention may permit a user to interact with the appliance (which may be a mobile phone) as transparently as possible in the initial phases, in that little or no other interaction is required of the user beyond pressing keys representative of desired input. Operation from the idle screen greatly reduces user workload and training and avoids the need for intermediate steps that are known to discourage users. Such steps might include having to manually invoke different programs or manually changing the state or mode of the appliance. An advantage of the invention may be realized by assuming that a user would always attempt to perform an information search and determining from the user's actions during the input of data which form of search best matches the situation.

The invention may be implemented on an appliance having at least some means for user input, a display, and two way communication capability to allow the sending and receiving of information. Beginning with the appliance powered on, a typical cellular telephone, for example, will display some information on the display when in the resting or idle state. This information serves to comfort the user that there is at least some activity, and may comprise such things as an indication of signal strength, battery condition, current service provider and other information. When the user presses a button on the keypad, there may be a state change to indicate to the user that input activity is registered by the device. The exact change is usually specific to a particular model or manufacturer.

If the user wishes to enter information, this may be achieved by pressing keys in order to build a sequence of symbols corresponding to symbols that are marked on the keys. In general, these keys are those numbered 1 through 9, *, 0 and #. Conventionally, the numeric keys 2-9 have other symbols (such as alphabetic characters for example) printed on them, the 1 key is often used to represent some punctuation element, the 0 key is often used to enter a space and the * and # keys may represent other symbols depending upon the manufacturer's implementation preferences. Beyond these 12 information entry keys, certain editing functions may be enabled otherwise. For example, the cursor or current position marker on the screen may be moved by some navigation method such as a multi-way switch corresponding to up, down, left and right. The action of clearing an entered symbol (e.g. a number or letter) or even the entire sequence may be accomplished by a key solely assigned for this purpose. This may be contextual, whereby striking and releasing the key may remove the single prior element, but pressing and holding the key may remove all prior elements entered so far and reset the cursor to the beginning of the entry. As a routine matter, entries are often stored in a buffer in memory and the display merely shows the buffer contents at any point in time for the convenience of the user.

U.S. patent application Ser. No. 11/562,054 describes an implementation where a user enters information from the keypad and this information is compared to a data table that comprises information stored locally on the appliance. In the case of the user entering the first few letters of the word Camera, with the desire of turning the appliance's camera function on, the entered key sequence using the keypad layout of FIG. 1 would be 226. This information is now compared by the program to the local data list and all possible matches are recovered. Those matches in the contacts databases or in the telephone logs of dialed or received numbers may be displayed as possible symbolic matches corresponding to the possible ambiguous interpretations of the pressed keys in sequence. So in this example, the appliance user might see on the display a telephone number 18722265345 shown as a recently used number, as well as a Name "Canadian Occidental" from the contacts list, and Camera from the applications or program list. Selection of one of these displayed options would result in the appliance performing an appropriate action. Selecting the recently used number could allow a user to choose between editing the number, adding it to the contact database or calling the number. In keeping with advanced services, one additional option may be to allow a user to create and send a text message to that number.

In a similar vein, selecting a Name from the possible symbolic matches might cause the dialing of a phone number related to the selected Name, which phone number might be one of several and so an auxiliary option of choosing which number would be dialed could be provided. Selecting the user-intended action (which was to turn on the Camera) would allow a choice of actions if more than one were available, but in this case the user might simply be able to invoke the program that allows the camera to be enabled and to capture an image that is displayed on the screen for capture.

U.S. patent application Ser. No. 11/294,995 describes a method in which synonyms are tabulated so that a user might be relieved of the task of entering the exact term. For example, a user entering the sequence 746 . . . PHO to might still arrive at the program that invokes the camera function.

In U.S. patent application Ser. No. 11/562,054, a dynamic data table is used and is included in the matching process. This table is intended to be altered only by the service provider directly, and the ability to adjust its contents may be limited to the service provider or an approved proxy. A minor provision that allows a user to ignore (flag off) particular entries in the table, removes them from the comparison processes and reduces the possibilities, especially if the categories hold no interest for the user. In this example, the dynamic element means the changeability of the table. In other embodiments of the invention, selection of one of these dynamic candidates will usually direct the user to a remote data server and will invoke a browser session directed to the remote address.

The processes in the prior art are contingent upon making information local and then performing a search of local data. Although this is a substantial utility, the task of allowing a broader search beyond the environment of the appliance has been clumsy because the user has been required to open a browser, and then begin to enter text into a search box. The present invention provides a solution to this problem.

In an embodiment of the invention, a user may begin to enter information corresponding to the desired search. For ease of use, it may be beneficial if the user is able to specify whether an internal or external search is to be performed, but this decision does not have to be made until a final selection occurs. In one implementation of the invention, the user simply enters data and is shown candidates from both local and externally pointed data tables limited only by the display capability of the appliance. In another implementation, results may be displayed on a screen so that a user may flip or switch between internal and externally pointed information. A user enters a symbol string by pressing the key associated with the symbol, either by being printed upon the key or being legended on a display, each key in turn creates a sequence which is buffered, which sequence may spell out the intended term or some equivalent. In an ideographic system of writing, symbols such as strokes may be marked upon a key and their linear sequence used to determine which character or ideogram is intended. The key values stored in the buffer may be compared initially to stored data in the appliance's search lists or tables. These lists or tables may also contain lists of words used as dictionary items in any text based application, as well as labels or other terms provided by the user or by an operator or service provider. There is no basic limit on the number of or structure of such tables and lists.

The continued entry of information by the user will generally exhaust local possibilities fairly quickly, and the matching candidates to the entered data will usually comprise a list that is so short as to be able to be displayed upon the screen in its entirety. Once the number of local possibilities falls below some predetermined level, it is likely that an external search is more appropriate. Previous technologies in this area simply cleared the screen of all data and assumed that the digit string being entered was the only valid remaining interpretation, but as the appliances become more aligned with the broader Internet enabled services, this feature may not be the best response to continued entry. Knowing this, broad responses may be invoked automatically. For example, once all matching local information is displayed for user selection, continued entry combined with non-selection, infers that a search of the appliance's local data has been unsuccessful. So one implementation of the invention may display appliance-resident data until there are fewer items than can be displayed on the screen, whereupon the remainder of the screen is filled by using matching data from the external links list. This external links list could comprise a table of popular search terms. Another implementation might intersperse local and external terms based on any of likelihood, recency, length of symbol sequence and so forth. This latter style is advantageous when shorter entries are being searched since the user need not force appearance of alternate matches.

In an embodiment of the invention, a user may be enabled to choose to view only terms or candidates from one list or the other. This may be accomplished by showing both sets of candidates in part and allowing the user to display the preferred list by simply moving a cursor.

Selection from a list of possibilities may be achieved by any of a number of actions. A user may select by moving a cursor to the desired candidate and pressing a soft or hard select key. If the function is an internal one, then selection may invoke a program or cause an action, such as dialing a phone number. If the selection comes from a table of search words, then selection may cause that term to be transmitted to a remote receiver whilst invoking a program on the local appliance to allow user interaction subsequently.

If a user continues to enter information, then the first time the appliance fails to find a match in its internal data tables or the number of displayed candidates falls below a predetermined threshold, including the table of frequent external searches, as evidenced by the entry of a delimiter, the microprocessor may be programmed to effect an assumption that the user wishes to use an alternate candidate to perform an external search. In this case, data entered so far may be reconstrued and the contents of the text dictionaries used for comparison instead of the list or table that contains the preferred set of terms. If an ambiguous keyboard is used, matches with internal data tables may occur frequently in the initial few symbols entered and this may prove annoying to a user if in fact the user knows that an external search is desired. Therefore, it may be beneficial to provide a user with the ability to call for an external search instruction at any time. Selection by default is a preferred method where selecting a list of candidates that is only associated with external searching causes this action upon selection of an actual term. Although confusion may occur when the same term is intended but appears both as internal and external listings, user context is normally clear. For example if the user enters a sequence such as 2263 . . . intending to find Camera, it is possible that the internal function of a camera would appear as would the term camera directed towards an external search. The user may be directed to choose whether this will be an internal or external function simply by emphasizing the ambiguity and asking the user to select, if a selection has not already occurred.

FIG. 1 depicts an appliance 10 according to the invention. This appliance has a microprocessor 13 that is in communication with an input device 16. The input device may be a keypad having one or more polysemous keys 25, which may be used to indicate to the microprocessor a possible symbol desired by the user. The keys 25 may have symbols 22 noted on each key in order to assist the user with selecting a desired key 25. The symbols 22 may be numbers, letters, or "strokes" of characters in an idiographic language (e.g. Japanese). The microprocessor 13 may have (or have access via a communications link to) a dynamic database 209 and a dictionary database 212. The microprocessor 13 may be in communication with a display 19 which may be capable of displaying objects 28, and a selection indicator 36. The selection indicator 36 may be used to identify a particular object 28 on the display 19 by known methods such as, for example, underscoring the object 28. The microprocessor 13 may also be in communication with a memory device reader 206, which may be capable of reading a computer readable memory device 200. The computer readable memory device 200 may be, for example, a cd-rom or flash drive and may contain instructions 203. A remote server 215 is shown in FIG. 1 in communication with the microprocessor 13 via a communications link 218, which may be, for example, a cellular data connection.

Figure 2:
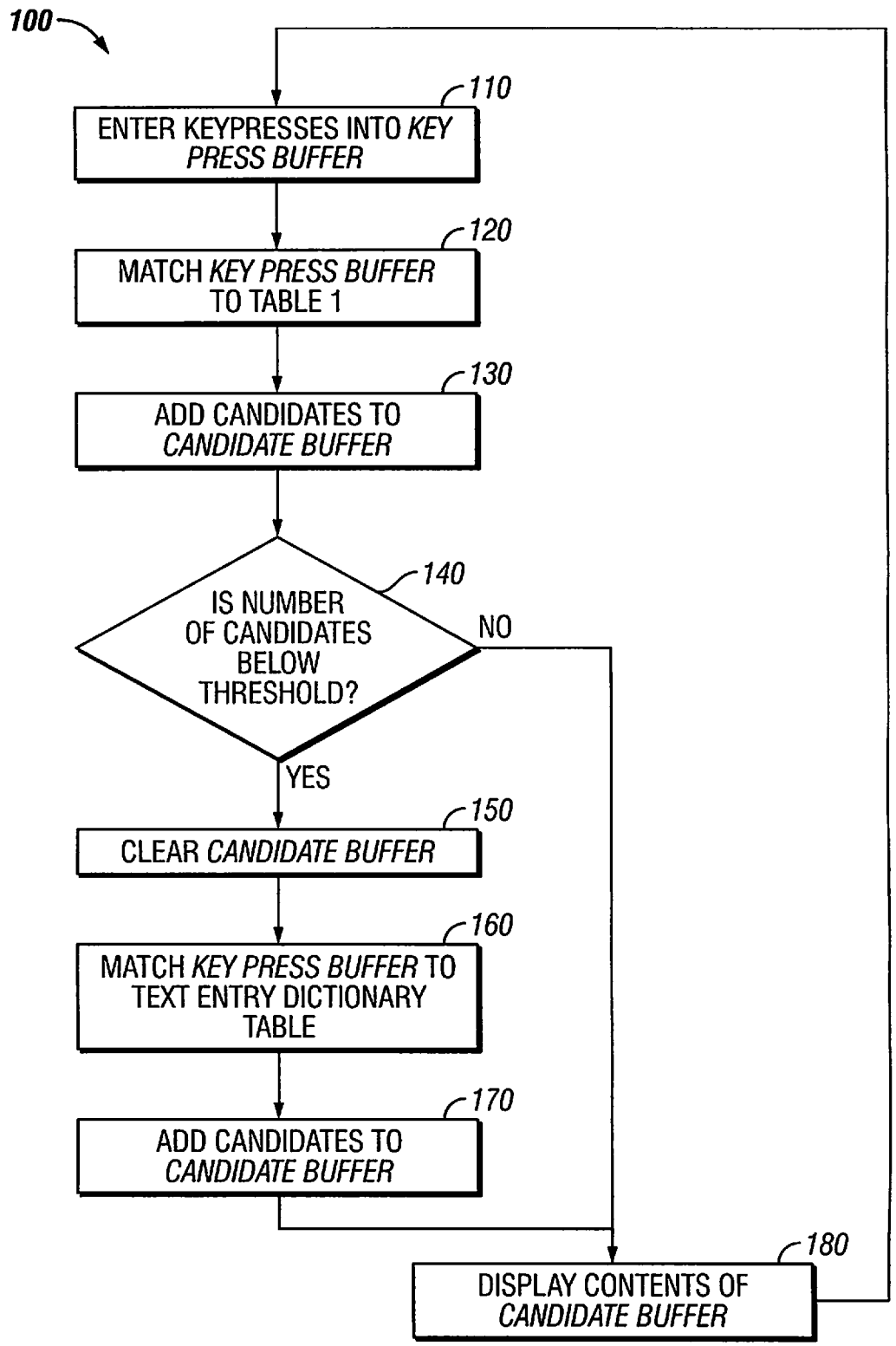
FIG. 2 is a flow chart showing a method that is in keeping with the invention.

FIG. 2 shows a method according to the invention in which the keypresses are matched against a series of tables. Each time a match is made, the candidate may be added to a buffer for display. Eventually all matches from a table will be found, and the display may show some or all matches. Each time a keypress is added to a keypress buffer by the user's pressing of the polysemous keys, there may be fewer matches (but never more). If a delimiter is encountered, entry is complete for that word and now only matches containing that word will be stored in the candidate buffer. If the entry is continued and the number of matches drops below a predetermined threshold, then the key press buffer will be used to identify matches in a text entry dictionary table, and word possibilities will be generated for display as if a text message is being created. As such, the invention provides an automated transition from a simple search using preset tables (dynamic indexing where at least one of the tables is changeable), to a text creation format allowing freeform keywording.

Toward these ends, FIG. 2 shows such a method 100 in which the user enters 110 keypresses which are stored in the key press buffer. The appliance may perform a match 120 of the value(s) in the key press buffer to the records of a first table (table 1). Any matching records ("candidates") from table 1 may be added 130 to a candidate buffer. The number of candidates in the candidate buffer may be compared 140 to a threshold number of desired candidates. If the number of candidates is greater than or equal to the threshold value, the contents of the candidate buffer are displayed 180 to the user of the appliance. If the number of candidates is below the threshold, the candidate buffer may be cleared 150, the value(s) in the key press buffer may be matched 160 to the records of a text entry dictionary table, the matching records from the dictionary may be added 170 to the candidate buffer, and the contents of the candidate buffer may be displayed 180.

Although the present invention has been described with respect to one or more particular embodiments, it will be understood that other embodiments of the present invention may be made without departing from the scope of the present invention. Hence, the present invention is deemed limited only by the appended claims and the reasonable interpretation thereof.

The invention claimed is:

1. A personal appliance, comprising:
   a display;
   a keypad having keys, at least some of the keys allowing for the entry of more than one symbol with a single press of the key in order to provide an ambiguous indication;
   a microprocessor having the ability to receive ambiguous indications from the keypad, and programmed to:
   (i) responsive to receiving the ambiguous indications from the keypad, identify entries from one or more databases, the entries corresponding to the ambiguous indications;
   (ii) provide the entries from the one or more databases to a user via the display;
   (iii) when the number of displayed entries provided to the user falls below or is at a predetermined threshold number of entries, to reconstrue said ambiguous indications, to further allow freeform kevwordinq via a text creation format, and to subsequently search an additional database that is a text dictionary, wherein said additional database is used for comparison instead of a list or table, wherein the corresponding entries from the additional database are displayed to the user for selection.

2. The personal appliance of claim 1, wherein the additional database is not resident on the personal appliance.

3. The personal appliance of claim 2, wherein the microprocessor is also programmed to automatically establish a communications link with the additional database.

4. The personal appliance of claim 3, wherein the microprocessor is also programmed to automatically invoke a browser and populate an entry field of the browser with one of the entries from the additional database.

5. A personal appliance for displaying textual candidates comprising:
   (a) a display;
   (b) an input device having polysemous keys;
   (c) a first table having records; and
   (d) a text entry dictionary table having records;
   a receiving processor for accepting presses of the keys to provide a sequence of ambiguous keypresses;
   a storing processor for storing the sequence of keypresses into a key press buffer;
   a comparing processor for comparing the stored sequence in the key press buffer with the records of the first table, wherein the first table is any of a preset table, thereby providing a simple search, and a changeable table, thereby providing dynamic indexing;
   an identifying processor for identifying records in the first table that match the stored sequence in the key press buffer;
   a storing processor for storing into a candidate buffer all records of the first table that were identified as a match;
   a determining processor for determining if the number of records stored in the candidate buffer is below a predetermined threshold number indicating that no selection is determined, and if so:
   (a) clearing the stored records from the candidate buffer in response to determining the number of records stored in the candidate buffer is below a predetermined threshold number;
   (b) responsive to clearing the stored records from the candidate buffer, allowing freeform keywording via a text creation format that comprises comparing the stored sequence in the key press buffer with records of a second table, the second table being a text dictionary;

(c) identifying records in the second table that match the stored sequence in the key press buffer; and
(d) storing into the candidate buffer all records of the second table that were identified as a match; and
a displaying processor for displaying the contents of the candidate buffer on the display.

\* \* \* \* \*